July 9, 1940.   H. MÜLLER ET AL   2,206,914
FUEL INJECTION DEVICE
Filed Feb. 10, 1938   3 Sheets-Sheet 2
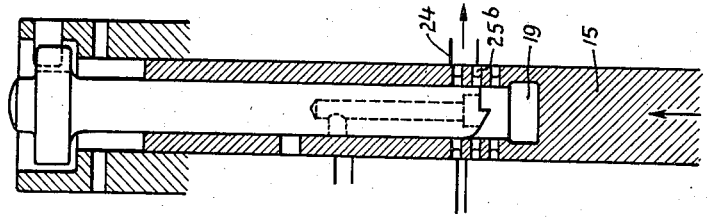
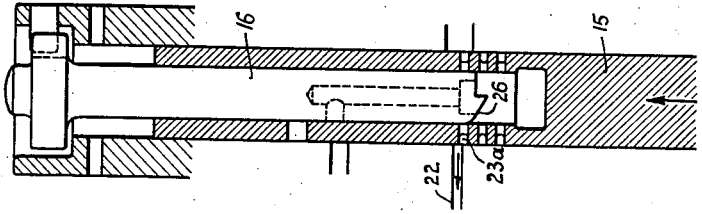
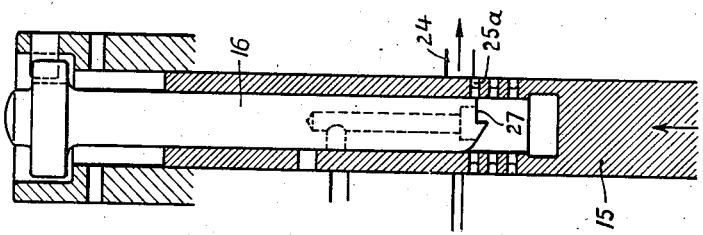
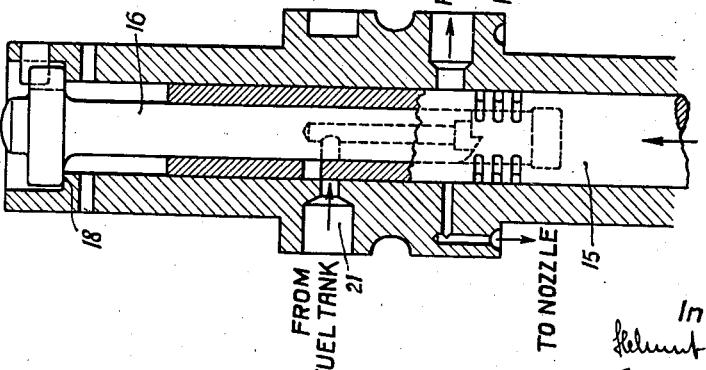
Inventors:
Helmut Müller
Anton Pieninger

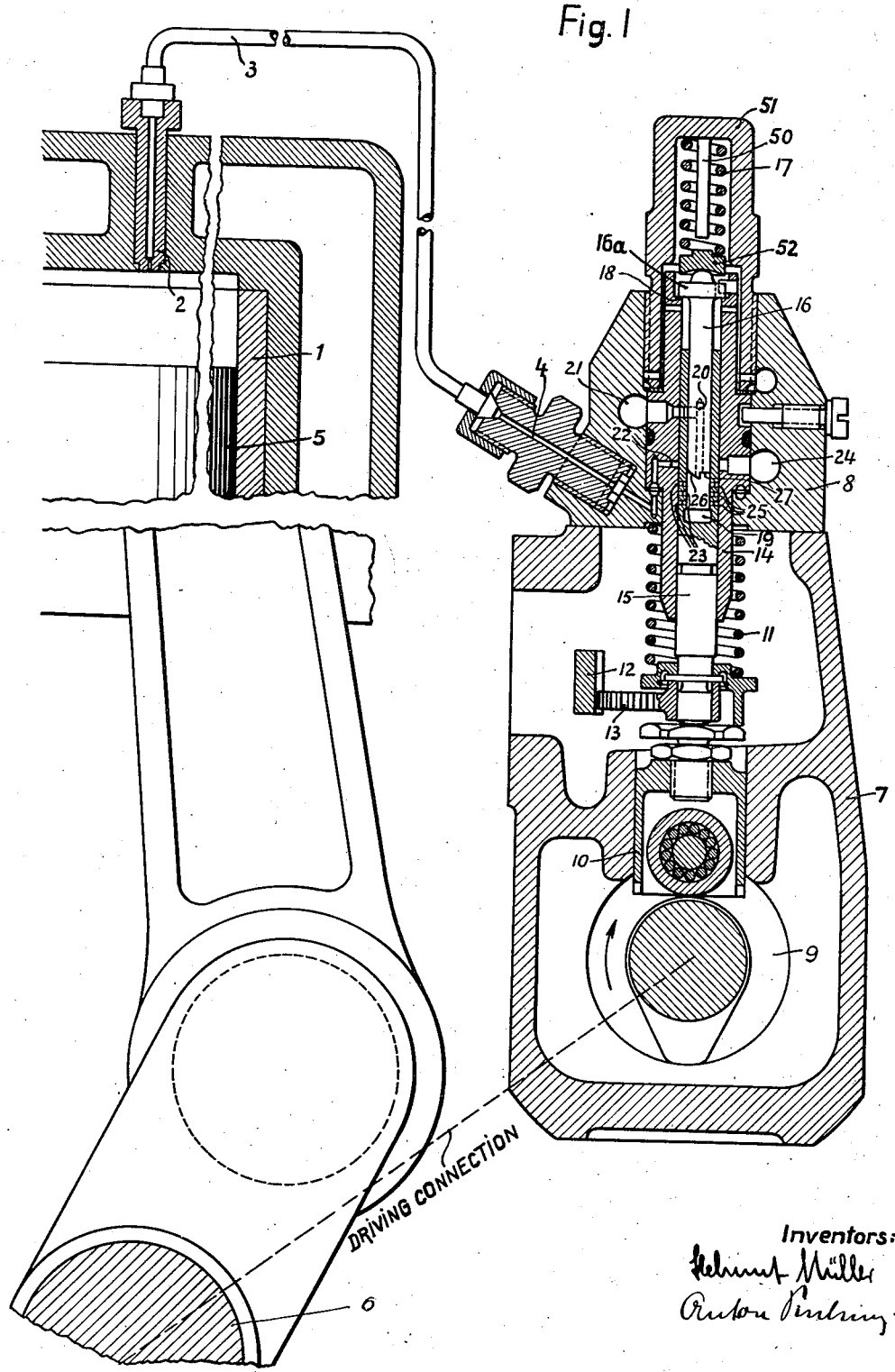

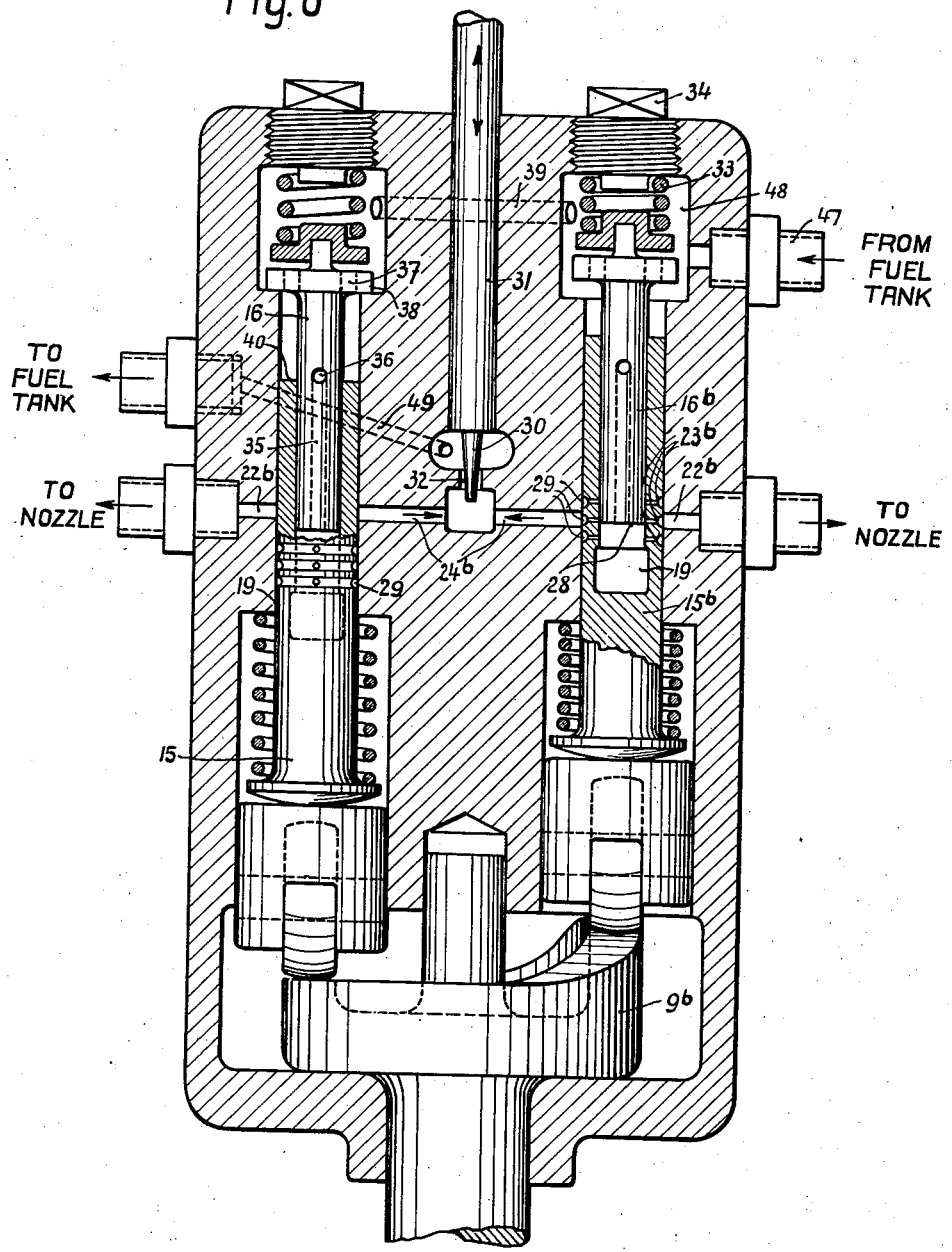

Patented July 9, 1940

2,206,914

UNITED STATES PATENT OFFICE 2,206,914

FUEL INJECTION DEVICE

Helmuth Müller and Anton Pischinger, Cologne, Germany, assignors, by mesne assignments, to Klöckner-Humboldt-Deutz, A. G., Cologne-Deutz, Germany, a corporation of Germany Application February 10, 1938, Serial No. 189,768
In Germany February 18, 1937

10 Claims. (Cl. 103—41)

The invention relates to a fuel injection device for internal combustion engines. Its principal object is to make the degree of perfection of fuel injection independent of the speed of the engine, which is particularly necessary for injection through an "open nozzle."

Experience shows that the nozzle must be proportioned in its size to the amplitude of the pressure wave produced in the fuel for injection. If the nozzle is too small, the pressure wave is partially reflected at the end of the injection conduit. If it is too large the pressure wave is followed by a so-called vacuum wave, which sucks out of the conduit a certain amount of fuel. With the customary fuel pumps driven positively by the cam shaft the pressure wave is variable in accordance with the speed of the pump piston, that is, the speed of the engine, so that the nozzle can only operate in the desired way for a single speed.

The pressure equalizing pumps used heretofore, which accomplish the injection by a pressure produced by a spring, and therefore uniform over all speeds, have, on the other hand, the disadvantage that they inject a given quantity of fuel during a smaller crank angle at low speeds than at higher speeds. Such pumps therefore give a hard drive of the engine within the lower speed range and cause afterburning at higher speeds.

The principle of our invention is that the customary single pressure wave in the fuel line, which jets the fuel from the nozzle, is substituted by a plurality of separated pressure waves of uniform amplitude generated during each injection period, the amplitude of the pressure waves, and therefore the duration of the individual jets caused by each pressure wave, being independent of the engine speed; while the intermissions between pressure waves vary inversely with the engine speed, in order to overcome the usual effect of invariable injection pressure, which is to increase the total injection angle at higher engine speeds.

It is a particular object of the invention to break up the total injection for each work stroke into parts and to inject each part at the same crank angle, regardless of change in engine speed, thereby distributing the injection through a uniform extent of crank circle.

We prefer to divide the fuel charge for each work stroke into three parts, as it has been found that the machine will run smoothly even at low speed idle running, if it receives about one third the full load charge.

The total fuel charge is changed in conformance with the load, preferably by diverting a regulated portion of the fuel at each partial injection.

The invention will now be described in detail with reference to the drawings, wherein two illustrative embodiments of the invention are shown.

Fig. 1 shows one fuel injection system and parts of the engine in longitudinal section;

Figs. 2–5 are longitudinal sections of the pump on an enlarged scale, showing various positions; and Fig. 6 is a longitudinal section of another form of pump.

The pump shown in Fig. 1 is essentially distinguished from previously known injection pumps only in the cooperating arrangement of the pistons and the control ports in the pistons and in the pump cylinder. Of usual construction are the drive housing 7, the pump block 8, cam shaft 9, driving tappet 10, return spring 11, rack bar 12, and toothed segment 13 on the pump piston, for angular adjustment thereof. On the engine cylinder 1 is a fuel injection nozzle 2 connected by an injection conduit 3, 4 with a pressure conduit 22 of the fuel pump. A piston 5 operates in cylinder 1 and is connected to a crank shaft 6. The crank shaft drives cam shaft 9 through gearing represented by the dash line and legend "Driving connection."

In the pump cylinder 14 reciprocates the driven piston 15, which in turn receives in an axial bore the complementary piston 16 which serves to equalize the pressure. The equalizing piston is pressed from above by a spring 17 into the position of rest in which it is shown, wherein its shoulder 16a abuts against a seat 18 of the cylinder.

The pump chamber 19 is formed between the two pistons in the interior of the synchronously driven piston 15, in the lower dead center position of which it communicates through a longitudinal bore 20 of the equalizing piston and through transverse ports with the suction channel 21 from which fuel is supplied to the pump chamber. The pressure conduit 22 enters into communication with the pump chamber repeatedly during the upward stroke of the piston during the passage of the injection ports 23 past it. Before each injection a connection is established between the pump chamber 19 and the overflow conduit 24 through additional diversion ports 25. The ends of the partial injections and the individual diversions are controlled, respectively, by the passage of the inclined edge 26 and the straight cut-off edge 27 of equalizing piston 16 over the injection ports 23 and diversion ports 25.

Fig. 2 shows a piston 15 in its position at the cut-off of the suction duct 21. The equalizing piston 16 still rests with its shoulder 16a upon the seat 18 of the pump cylinder. Upon further upward movement of the piston the fuel enclosed between the pistons is compressed and the equalizing piston is carried along.

Fig. 3 shows the pistons toward the end of the first diversion: The port 25a is communicating with the overflow conduit 24 and the equalizing piston 16 presses fuel out through the port 25a, until the cut-off edge 27 again covers the port.

Fig. 4 shows the piston toward the end of the first injection: The pressure conduit 22 leading to the nozzle registers with the port 23a, so that the equalizing piston 16 feeds a certain amount of fuel toward the injection nozzle. The end of this partial injection is determined by the passage of the inclined cut-off edge 26 of the equalizing piston over the port 23a.

In Fig. 5 the piston 15 has, by further upward movement, for the second time established communication between the pump chamber 19 and the overflow conduit 24. The second diversion occurs with the equalizing piston in the same position as in Fig. 3. Thereupon follow the second injection, the third diversion, and the third injection, in the same manner.

The equalizing piston can be provided with means for limiting its upward movement, preferably in the form of a relatively stiff spring. In the drawing the limiting means is represented by a prong 50 projecting downward from the cap 51 which covers spring 17, to form an abutment for bearing disk 52 at the top of piston 16. The limitation of the movement of piston 16 has the purpose of preventing carbonizing of the nozzle by increasing the pressure and thus blowing out any stoppage.

In Fig. 6 corresponding parts are designated by the same reference numerals, with the addition of the suffix b. The individual pumps are driven by the same cam 9b. The bottom edge 28 of the equalizer piston 16b controls ports 23b leading from three annular grooves 29 of piston 15b into the pump chamber within the piston. The annular grooves 29 successively connect the pump chamber 19 with the injection conduit 22b leading to the fuel nozzle in the working cylinder, and at the same time with the overflow conduit 24b. The fuel diverted from each pump escapes through a throttle aperture 32 regulated by a cone 30 of a regulating rod 31 and is led either into the suction channel or into a fuel tank, through a duct 49.

The equalizing springs 33 can be adjusted to the desired injection pressure by means of the screw plugs 34. In the position of the piston shown at the left side of the pump, the pump chamber 19 is in open communication with a suction channel 39 and a suction chamber 48 containing the equalizing spring 33, through an axial bore 35 and port 36 of the equalizing piston 16, and further through a bore 37 in shoulder 38 of the piston. The fuel comes from a fuel tank (not shown) through a nipple 47 into suction chamber 48.

The operation of the pump is as follows:

In the position of the left hand piston shown, fuel flows from the suction chamber 48 through suction channel 39 and through bores 35 and 36 of the equalizing piston 16 into the pump chamber 19, in which at first sub-atmospheric pressure prevails. During upward movement of the piston 19 first the upper edge 40 of piston 15 passes over the port 36 of the equalizing piston, so that no more fuel can escape from the pump chamber 19. Upon further upward movement, therefore, the equalizing piston is carried along through the medium of the fuel in the pump chamber and the equalizing spring 33 is compressed. Thereupon the annular grooves 29 are successively brought into communication with the injection conduit 22b and the diversion conduit 24b. By expansion of spring 33 the equalizing piston each time presses out just as much fuel through the port 23b as will bring the bottom edge 28 of the equalizing piston in position to shut off the port 23b which is in communication with the conduits 22b and 24b. The next partial injection occurs just when the next annular groove 29 comes into register with the conduits 22b and 24b. Of the quantity of fuel in the pump chamber between two annular grooves, one part escapes through the injection nozzle and the other through the throttle 32, in inverse ratio to the resistances. By adjusting the throttle opening by means of the cone 30 the ratio is changed and thus the portions injected into the working cylinder are regulated. Whereas throttle regulation with fuel injection pumps having a positively driven piston has the disadvantage that the largest feed of fuel which can be adjusted decreases with the engine speed, throttle regulation in combination with the equalizing pump gives a uniform charge, because the amplitude of pressure of an equalizing pump is independent of the speed of rotation of the engine.

We claim:

1. In a fuel feeding device for internal combustion engines, pumping means comprising two telescoping pistons defining between them a pump chamber, a cylinder in which the outer one of said pistons is adapted to reciprocate, means for supplying fuel to said pump chamber, means for reciprocating the outer one of said pistons, elastic means pressing the inner one of said pistons in the direction to reduce the size of said pump chamber, said outer piston having an axially distributed series of injection ports, said cylinder having an outlet port with which said injection ports are adapted to register successively during the reciprocation of said outer piston, said inner piston being adapted to move under the influence of said elastic means to press fuel out through each registered port in turn and having a cut-off edge for closing said ports successively as it advances.

2. In a fuel feeding device for internal combustion engines, pumping means comprising two telescoping pistons defining between them a pump chamber, a cylinder in which the outer one of said pistons is adapted to reciprocate; means for supplying fuel to said pump chamber, means for reciprocating the outer one of said pistons, elastic means pressing the inner one of said pistons in the direction to reduce the size of said pump chamber, said outer piston having an axially distributed series of injection ports, said cylinder having an outlet port with which said injection ports are adapted to register successively during the reciprocation of said outer piston, said inner piston being adapted to move under the influence of said elastic means to press fuel out through each registered port in turn and having a cut-off edge for closing said ports successively as it advances, an overflow conduit, and means whereby a regulated amount of fuel is diverted from said pump chamber into said overflow conduit each time a quantity of fuel is pressed through each of said injection ports.

3. In a fuel feeding device for internal combustion engines, pumping means comprising two telescoping pistons defining between them a pump chamber, a cylinder in which the outer one of said pistons is adapted to reciprocate, means for supplying fuel to said pump chamber, means for reciprocating the outer one of said pistons, elastic means pressing the inner one of said pistons in the direction to reduce the size of said pump chamber, said outer piston having an axially distributed series of injection ports and an axially distributed series of diversion ports, outlet ports in said cylinder with which said injection and diversion ports are adapted respectively to register during the reciprocation of said outer piston, said inner piston being adapted to move under the influence of said elastic means to press fuel out through each registered port in turn and having cut-off edges for closing said ports successively as it advances.

4. In a fuel feeding device, for internal combustion engines, pumping means comprising two telescoping pistons defining between them a pump chamber, a cylinder in which the outer one of said pistons is adapted to reciprocate, means for supplying fuel to said pump chamber, means for reciprocating the outer one of said pistons, elastic means pressing the inner one of said pistons in the direction to reduce the size of said pump chamber, said outer piston having an axially distributed series of injection ports and an axially distributed series of diversion ports, outlet ports in said cylinder with which said injection and diversion ports are adapted respectively to register during the reciprocation of said outer piston, said inner piston being adapted to move under the influence of said elastic means to press fuel out through each registered port in turn, said inner piston having a cut-off edge in a plane perpendicular to its axis for closing the ports of one of said series and an inclined cut-off edge for closing the ports of the other series, and means for angularly adjusting one of said pistons about its axis.

5. In a fuel feeding device for internal combustion engines, pumping means comprising two telescoping pistons defining between them a pump chamber, a cylinder in which the outer one of said pistons is adapted to reciprocate, means for supplying fuel to said pump chamber, means for reciprocating the outer one of said pistons, elastic means pressing the inner one of said pistons in the direction to reduce the size of said pump chamber, said outer piston having ports at several spaced points along its axis, said cylinder having a port adapted to register with said first ports during the reciprocation of said outer piston, said inner piston being adapted to move under the influence of said elastic means to press fuel out through each registered port and to close said ports, an overflow conduit, means for diverting fuel from said ports to said overflow conduit, and an adjustable throttle controlling the flow of fuel through said overflow conduit.

6. In a fuel feeding device for internal combustion engines, pumping means comprising two telescoping pistons defining between them a pump chamber, a cylinder in which the outer one of said pistons is adapted to reciprocate, means for supplying fuel to said pump chamber, means for reciprocating the outer one of said pistons, elastic means pressing the inner one of said pistons in the direction to reduce the size of said pump chamber, said outer piston having an axially distributed series of injection ports and an axially distributed series of diversion ports, each diversion port being in the same transverse plane of said outer piston with a corresponding one of said injection ports, outlet ports in said cylinder with which said injection and diversion ports are adapted respectively to register during the reciprocation of said outer piston, said inner piston being adapted to move under the influence of said elastic means to press fuel out through each registered port in turn, an overflow conduit communicating with the outlet port with which said diversion ports are registered, and an adjustable throttle controlling the flow of fuel through said overflow conduit.

7. In a fuel feeding device for internal combustion engines, pumping means comprising two telescoping pistons defining between them a pump chamber, a cylinder in which the outer one of said pistons is adapted to reciprocate, means for supplying fuel to said pump chamber, means for reciprocating the outer one of said pistons, elastic means pressing the inner one of said pistons in the direction to reduce the size of said pump chamber, said outer piston having an axially distributed series of injection ports and an axially distributed series of diversion ports, each diversion port being in the same transverse plane of said outer piston with a corresponding one of said injection ports, said outer piston having a series of annular grooves in its periphery connecting said injection ports respectively with said diversion ports, outlet ports in said cylinder with which said injection and diversion ports are adapted respectively to register during the reciprocation of said outer piston, said inner piston being adapted to move under the influence of said elastic means to press fuel out through each registered port in turn, an overflow conduit communicating with the outlet port with which said diversion ports are registered, and an adjustable throttle controlling the flow of fuel through said overflow conduit.

8. In a fuel feeding device for multicylinder internal combustion engines, a plurality of pumps, each pump having a pump chamber defined by two telescoping pistons, and a cylinder within which the outer one of said pistons is adapted to reciprocate, means for feeding fuel to said pump chambers, means for reciprocating the outer piston of each pump, elastic means pressing the inner piston of each pump in the direction to reduce the size of the pump chamber, the outer piston of each pump having an axially distributed series of injection ports, the cylinder of each pump having an outlet port with which said injection ports are adapted to register successively, the inner piston of each pump being moved by said resilient means to press fuel through each registered port, an overflow conduit, means whereby fuel is diverted from each pump into said overflow conduit substantially at the time of feed through each injection port, and an adjustable throttle controlling the flow through said overflow conduit.

9. In a fuel feeding device for internal combustion engines, pumping means comprising two telescoping pistons defining between them a pump chamber, a cylinder in which the outer one of said pistons is adapted to reciprocate, means for supplying fuel to said pump chamber, means for reciprocating the outer one of said pistons, elastic means pressing the inner one of said pistons in the direction to reduce the size of said pump chamber, said outer piston having an axially distributed series of injection ports, said cylinder having an outlet port with which said injection ports are adapted to register successively during the reciprocation of said outer piston, said inner piston being adapted to move under the influence of said elastic means to press fuel out through each registered port in turn and having a cut-off edge for closing said ports successively as it advances, and means for limiting the movement of said inner piston against the influence of said elastic means.

10. In a fuel feeding device for internal combustion engines, pumping means comprising two telescoping pistons defining between them a pump chamber, a cylinder in which the outer one of said pistons is adapted to reciprocate, means for supplying fuel to said pump chamber, means for reciprocating the outer one of said pistons, elastic means pressing the inner one of said pistons in the direction to reduce the size of said pump chamber, said outer piston having a series of injection ports, said cylinder having an outlet port with which said injection ports are adapted to register successively during the reciprocation of said outer piston, said inner piston being adapted to move under the influence of said elastic means to press fuel out through each registered port in turn and having a cut-off edge for closing said ports successively as it advances.

HELMUTH MÜLLER.
ANTON PISCHINGER.